(12) United States Patent
Chae et al.

(10) Patent No.: US 11,115,958 B2
(45) Date of Patent: Sep. 7, 2021

(54) METHOD WHEREBY TERMINAL TRANSMITS AND RECEIVES SIDELINK SIGNALS IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/324,526

(22) PCT Filed: Aug. 9, 2017

(86) PCT No.: PCT/KR2017/008635
§ 371 (c)(1),
(2) Date: Feb. 8, 2019

(87) PCT Pub. No.: WO2018/030788
PCT Pub. Date: Feb. 15, 2018

(65) Prior Publication Data
US 2019/0182806 A1    Jun. 13, 2019

Related U.S. Application Data

(60) Provisional application No. 62/372,791, filed on Aug. 9, 2016.

(51) Int. Cl.
*H04W 72/02*   (2009.01)
*H04L 1/18*    (2006.01)
(Continued)

(52) U.S. Cl.
CPC .............. *H04W 72/02* (2013.01); *H04L 1/18* (2013.01); *H04L 1/1812* (2013.01);
(Continued)

(58) Field of Classification Search
CPC ...... H04W 72/02; H04W 72/048; H04L 1/18; H04L 1/1812; H04L 1/1896; H04L 5/003; H04L 5/0037
See application file for complete search history.

(56) References Cited

U.S. PATENT DOCUMENTS

2007/0079207 A1*  4/2007  Seidel ................... H04L 1/1845
                                                714/748
2013/0225184 A1*  8/2013  Liu ...................... H04W 72/121
                                                455/450
(Continued)

FOREIGN PATENT DOCUMENTS

WO   2014170750    10/2014
WO   2015170871    11/2015

OTHER PUBLICATIONS

Dahlman et al., "4G: LTE/LTE-Advanced for Mobile Broadband", 2014, Elsevier, Second Edition, p. 98, Total pp. 3 (Year: 2014).*
(Continued)

*Primary Examiner* — Un C Cho
*Assistant Examiner* — Shah M Rahman
(74) *Attorney, Agent, or Firm* — Lee, Hong, Degerman, Kang & Waimey

(57) ABSTRACT

One embodiment of the present invention relates to a method whereby a first terminal transmits and receives sidelink signals in a wireless communication system, the sidelink signal transmission and reception method comprising the steps of: selecting a resource for executing a second transmission, the selection of which is restricted by the position of a resource selected for a first transmission; and executing the second transmission in the resource selected for the second transmission.

11 Claims, 10 Drawing Sheets

(51) Int. Cl.
*H04L 5/00* (2006.01)
*H04W 72/04* (2009.01)

(52) U.S. Cl.
CPC ............ *H04L 1/1896* (2013.01); *H04L 5/003* (2013.01); *H04L 5/0037* (2013.01); *H04W 72/048* (2013.01)

(56) References Cited

U.S. PATENT DOCUMENTS

| | | | |
|---|---|---|---|
| 2015/0071207 A1* | 3/2015 | Seo ................... | H04W 72/1284 370/329 |
| 2015/0319746 A1* | 11/2015 | Lu ........................ | H04L 1/1854 370/280 |
| 2016/0037572 A1* | 2/2016 | Yeh ................... | H04W 72/0406 370/329 |
| 2016/0073408 A1 | 3/2016 | Sartori et al. | |
| 2016/0128082 A1 | 5/2016 | Chen et al. | |
| 2017/0013466 A1* | 1/2017 | Xu ........................ | H04W 16/10 |
| 2017/0325243 A1* | 11/2017 | Yasukawa ............. | H04W 88/04 |
| 2018/0020365 A1* | 1/2018 | Xiong ................... | H04W 88/02 |
| 2018/0069664 A1* | 3/2018 | Khoryaev ............. | H04L 1/1621 |
| 2018/0077748 A1* | 3/2018 | Kazmi ................. | H04L 5/0044 |
| 2018/0083751 A1* | 3/2018 | Seo ........................ | H04L 5/0037 |
| 2018/0139724 A1* | 5/2018 | Loehr ................... | H04W 72/02 |
| 2018/0146500 A1* | 5/2018 | Muraoka ............... | H04W 24/02 |
| 2018/0167820 A1* | 6/2018 | Belleschi .............. | H04W 72/12 |
| 2018/0213438 A1* | 7/2018 | Muraoka ............... | H04W 8/005 |
| 2018/0227882 A1* | 8/2018 | Freda ................. | H04W 72/085 |
| 2019/0075547 A1* | 3/2019 | Chae ..................... | H04W 72/02 |
| 2019/0116586 A1* | 4/2019 | Basu Mallick ....... | H04W 72/02 |
| 2020/0084738 A1* | 3/2020 | Nguyen ............. | H04W 64/003 |

OTHER PUBLICATIONS

Schlienz et al., "Device to Device Communication in LTE Whitepaper", 2015, Rohde & Schwarz, D2D Communication—1MA264_0e, pp. 1-36, Total pp. 36 (Year: 2015).*

3GPP, "3GPP TS 36.321 3rd Generation Partnership Project; Technical Specification Group Radio Access Network; Evolved Universal Terrestrial Radio Access (E-UTRA); Medium Access Control (MAC) protocol specification", Dec. 2015, 3GPP, V13.0.0, Total pp. 82 (Year: 2015).*

ETSI, "ETSI TS 136 213 LTE; Evolved Universal Terrestrial Radio Access (E-UTRA); Physical layer procedures (3GPP TS 36.213 version 13.0.0)", May 2016, ETSI, V13.0.0, Total pp. 328 (Year: 2016).*

ETSI, "ETSI TS 136 331 LTE; Evolved Universal Terrestrial Radio Access (E-UTRA) Radio Resource Control (RRC); Protocol specification (3GPP TS 36.331 version 13.0.0)", Jan. 2016, ETSI, V13.0.0, Total pp. 670 (Year: 2016).*

PCT International Application No. PCT/KR2017/008635, Written Opinion of the International Searching Authority dated Nov. 28, 2017, 19 pages.

Intel, "Details of Resource Pool Design for Sidelink V2V Communication", 3GPP TSG RAN WG1 Meeting #85, R1-164140, May 2016, 7 pages.

* cited by examiner

FIG. 5
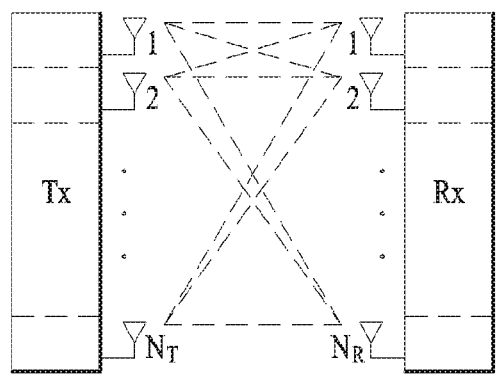
(a)
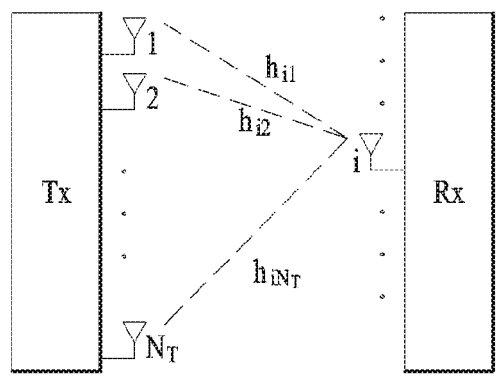
(b)

FIG. 8
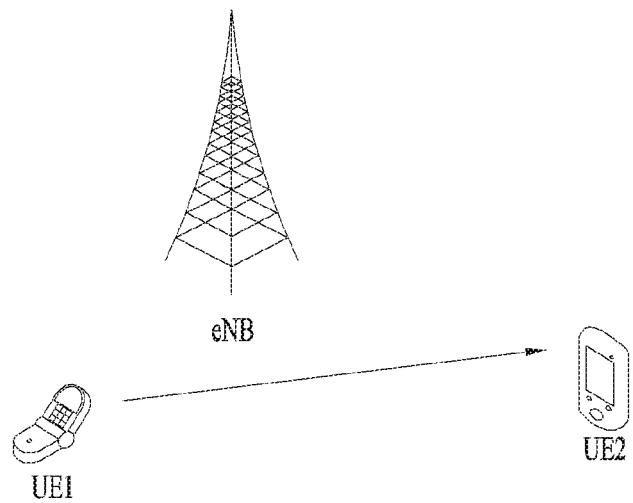
(a)
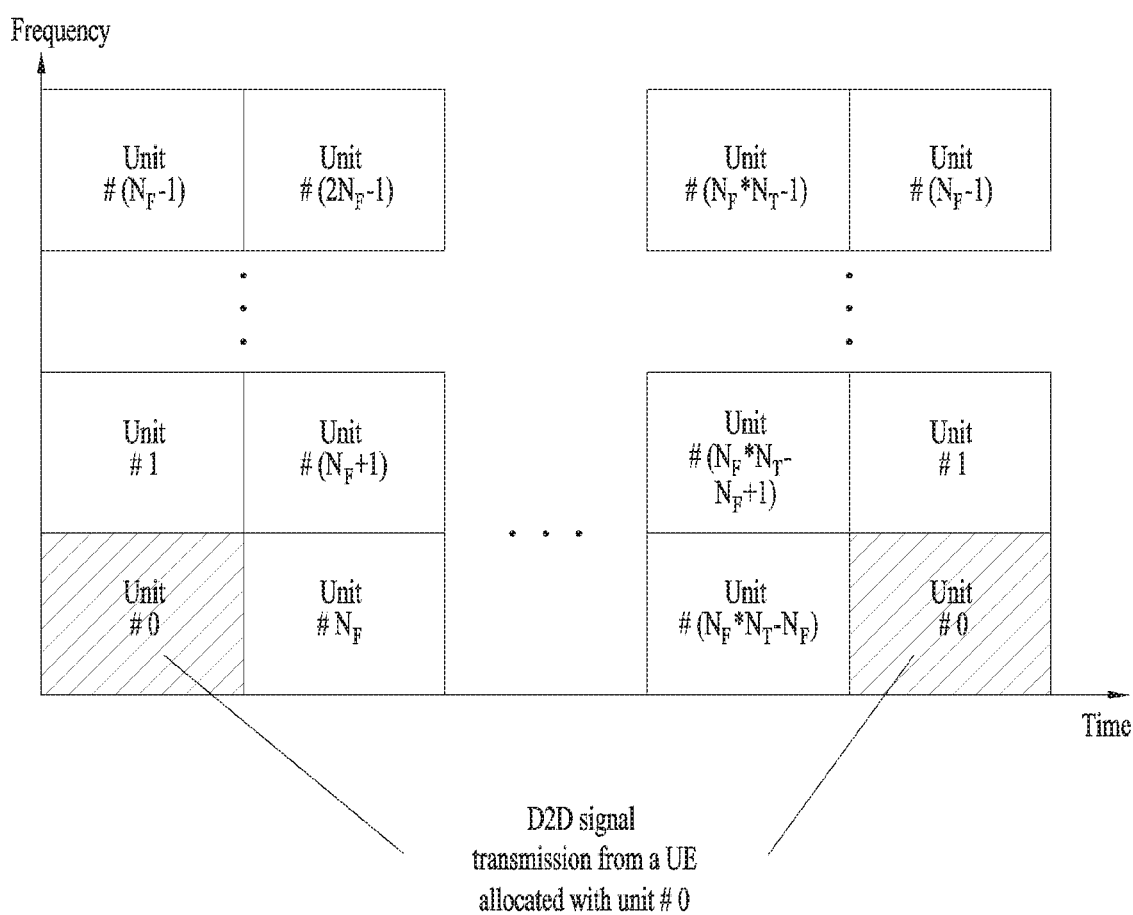
(b)

METHOD WHEREBY TERMINAL TRANSMITS AND RECEIVES SIDELINK SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2017/008635, filed on Aug. 9, 2017, which claims the benefit of U.S. Provisional Application No. 62/372,791, filed on Aug. 9, 2016, the contents of which are all hereby incorporated by reference herein in their entirety.

TECHNICAL FIELD

Following description relates to a wireless communication system, and more particularly, to a method of selecting a retransmission resource, a method of transmitting and receiving a sidelink signal using the retransmission resource, and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

A technical task of the present invention is to provide a method for a user equipment (UE) to select a retransmission resource in a sidelink, perform sidelink transmission using the retransmission resource, and receive the sidelink transmission.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these and other advantages and in accordance with the purpose of the present invention, as embodied and broadly described, according to one embodiment, a method of transmitting and receiving a sidelink signal, which is transmitted and received by a user equipment 1 (UE 1) in a wireless communication system, includes the steps of selecting a resource for performing a second transmission, in this case, the selection of the resource is restricted by a position of a resource selected for a first transmission, and performing the second transmission in the resource selected for the second transmission.

To further achieve these and other advantages and in accordance with the purpose of the present invention, according to a different embodiment, a user equipment 1 (UE 1) transmitting and receiving a sidelink signal in a wireless communication system includes a transmitter and a receiver, and a processor, the processor configured to select a resource for performing a second transmission, in this case, the selection of the resource is restricted by a position of a resource selected for a first transmission, the processor configured to perform the second transmission in the resource selected for the second transmission using the transmitter.

A user equipment 2 (UE 2) receiving the second transmission can perform HARQ combining on the first transmission and the second transmission only when an interval between the first transmission and the second transmission is less than a predetermined value.

The predetermined value related to the performance of the HARQ combining can be determined according to capability of the UE 2.

A position of a resource capable of being selected for the second transmission may correspond to a resource within +/−X subframes from the position of the resource selected for the first transmission A value of the X can be determined according to capability of the UE 2 receiving the second transmission.

A value of the X can be received by the UE 1 via physical layer signaling or higher layer signaling.

The method can further include the steps of selecting a resource for a third transmission after the second transmission is performed and performing the third transmission in the resource selected for the third transmission.

The resource for the third transmission may correspond to a resource within +/−X2 subframes from the position of the resource selected for the first transmission.

The resource for the third transmission may correspond to a resource within +/−X2 subframes from a position of the resource selected for the second transmission.

The resource for the third transmission may correspond to a resource within +/−X subframes from the position of the resource selected for the first transmission.

When the resource for performing the second transmission is selected, the position of the resource selected for the first transmission can be excluded.

When the resource for performing the second transmission is selected, a resource position in which control information of the first transmission is transmitted can also be excluded.

The first transmission and the second transmission can be performed for a single packet.

Advantageous Effects

According to the present invention, it is able to perform retransmission without laying an excessive burden on sidelink UEs. In addition, it is able to efficiently manage a sidelink in consideration of capability of sidelink UEs.

It will be appreciated by persons skilled in the art that the objects that could be achieved with the present invention are not limited to what has been particularly described hereinabove and other objects that the present invention could achieve will be more clearly understood from the following detailed description.

DESCRIPTION OF DRAWINGS

The accompanying drawings, which are included to provide a further understanding of the present invention and are incorporated in and constitute a part of this application, illustrate embodiments of the present invention and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE

Mode for Invention

Figure 1:
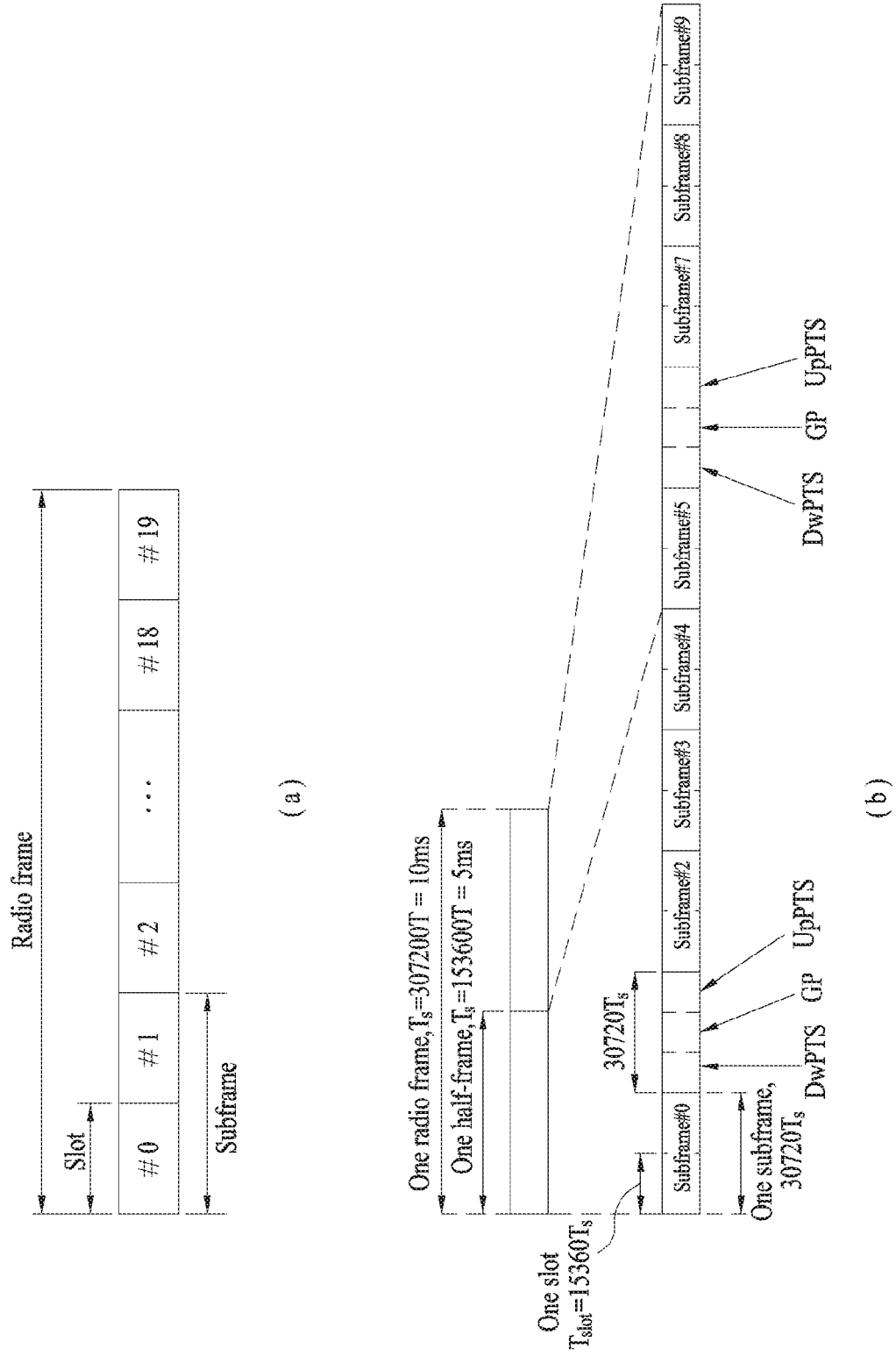
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
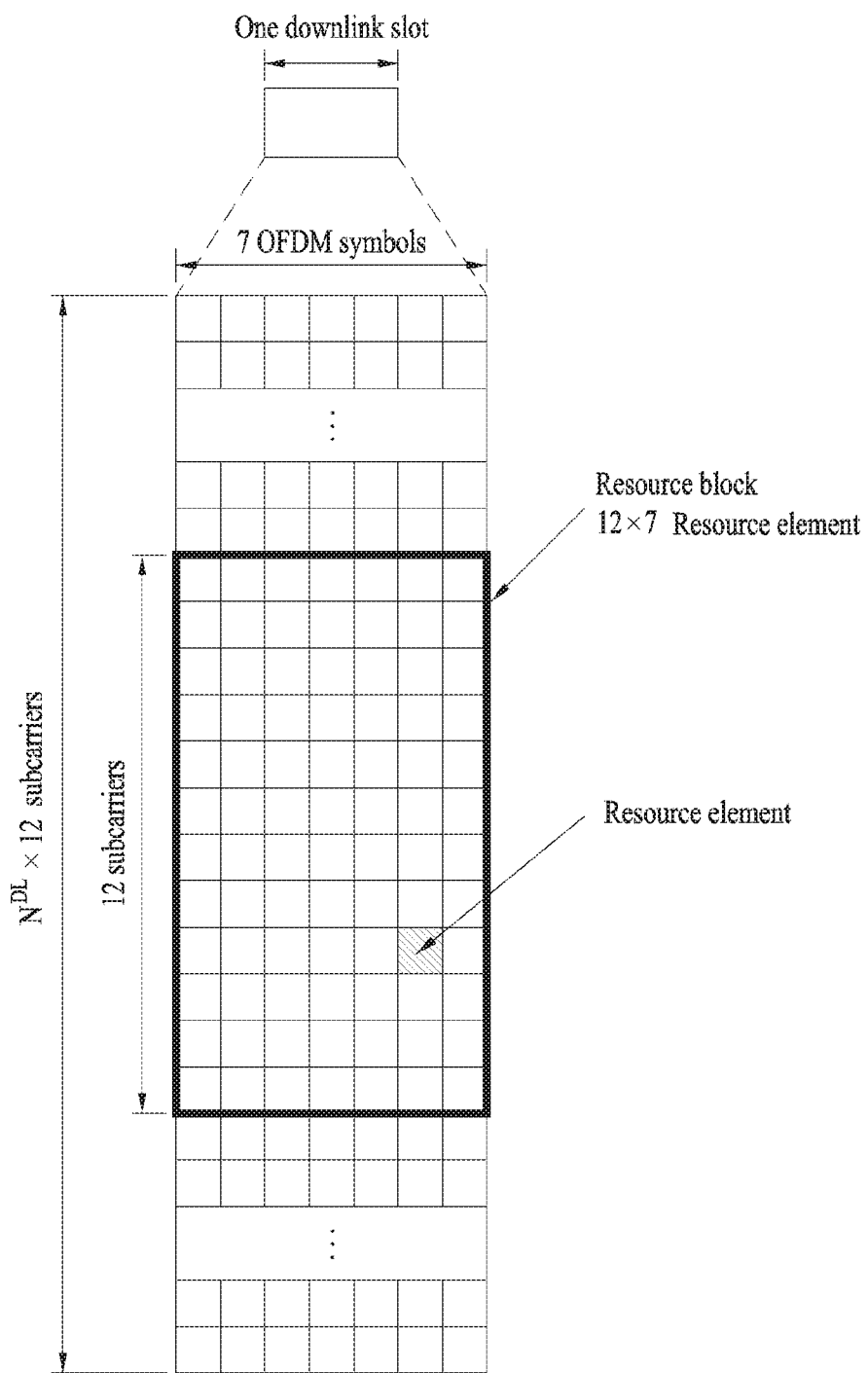
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
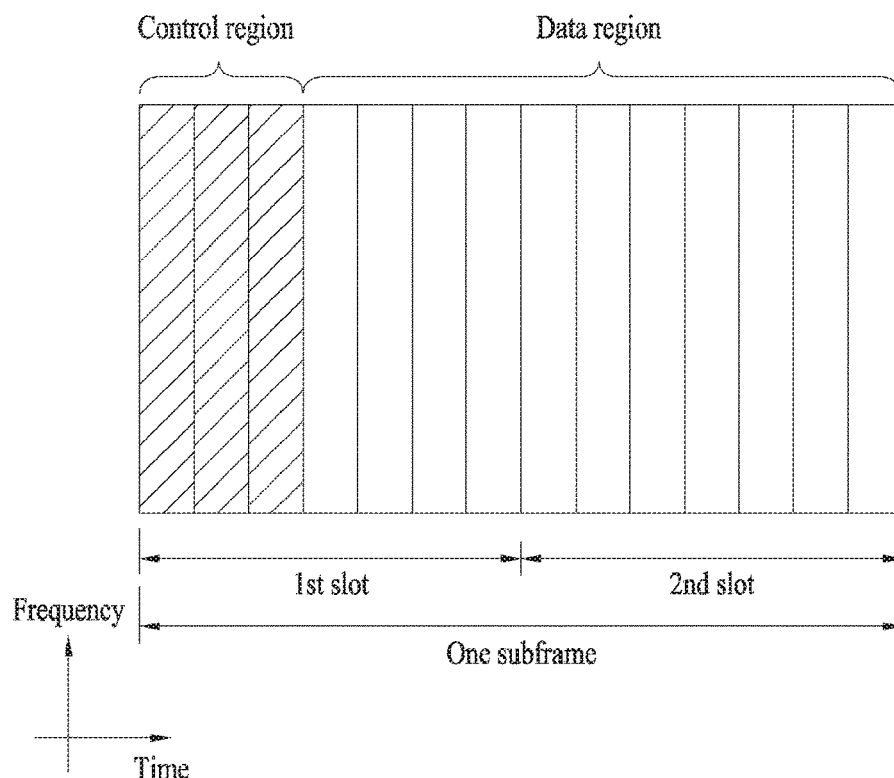
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
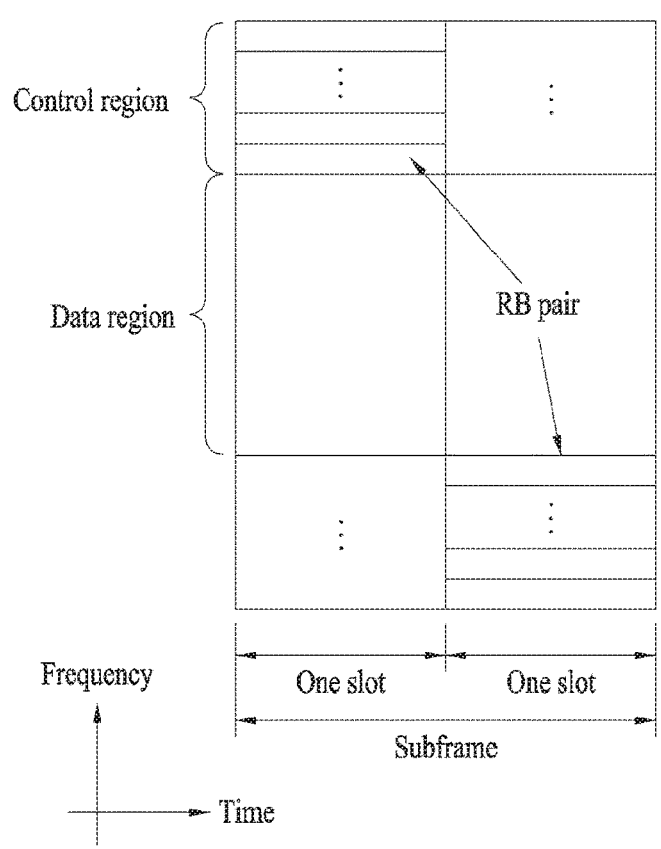
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s}[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y[y_1, y_2, \ldots, y_{N_R}]^T$$ [Equation 6]

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}]$$ [Equation 7]

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_R N_T} \end{bmatrix}$$ [Equation 8]

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_R N_T} \end{bmatrix}$$ [Equation 10]

$$\begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
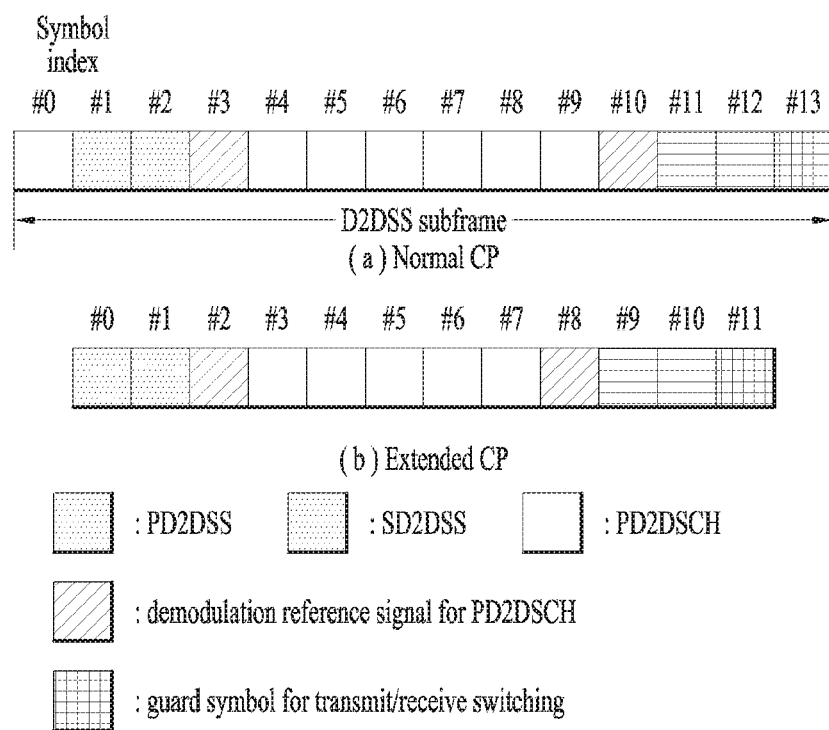
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
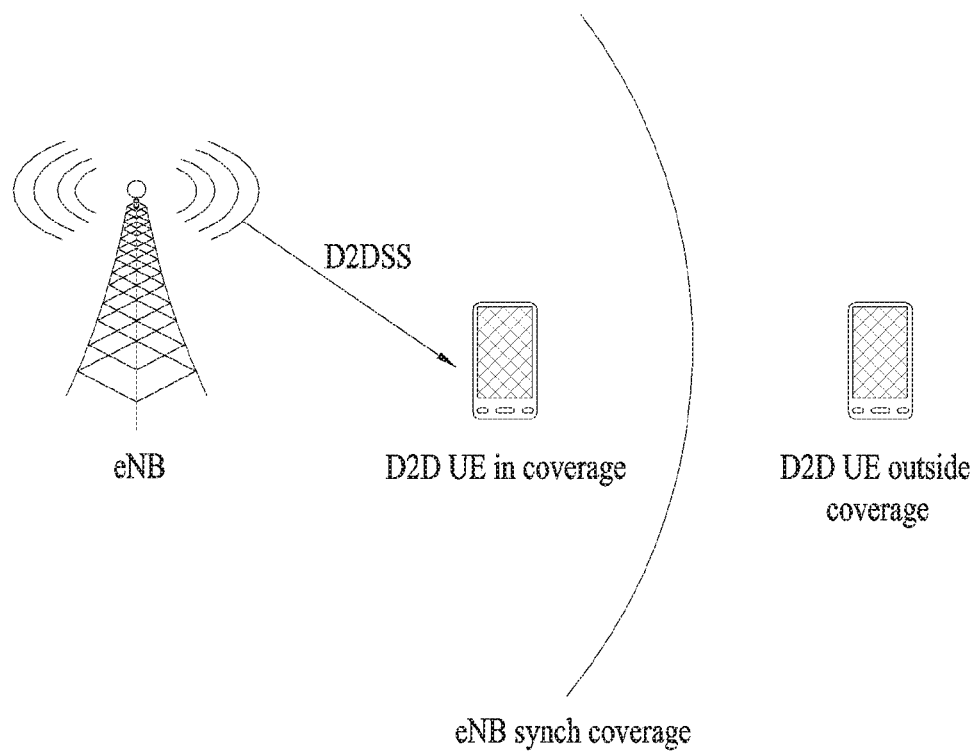
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(*a*), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(*b*) shows an example of configuring a resource unit. Referring to FIG. 8(*b*), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
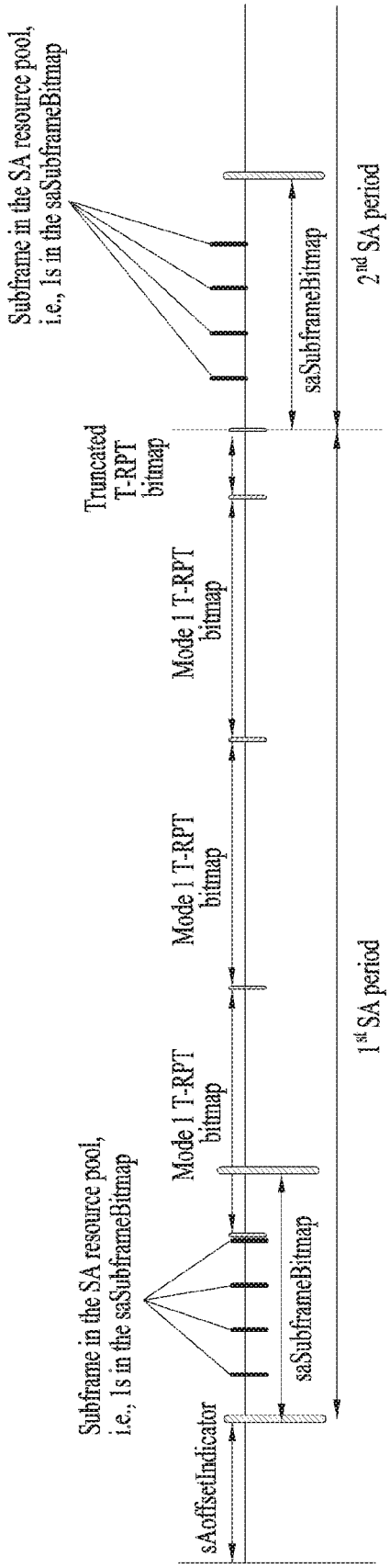
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

Meanwhile, in V2V (vehicle to vehicle) communication, a CAM (cooperative awareness message) of a periodic message type, a DENM (decentralized environmental notification message) of an event triggered message type, and the like can be transmitted. The CAM can include dynamic status information of a vehicle such as direction and velocity, static data of a vehicle such as a size, and basic vehicle information such as external light status, path history, and the like. A size of the CAM may correspond to 50 to 300 bytes. The CAM message is broadcasted and latency should be less than 100 ms. The DENM may correspond to a message which is generated when an accidental status such as malfunction of a vehicle, an accident, and the like occurs. A size of the DENM may be less than 3000 bytes. All vehicles located within a transmission range of the DENM can receive the DENM. In this case, the DENM may have a priority higher than a priority of the CAM. In this case, in the aspect of a single UE, the higher priority means that the UE preferentially transmits a message of a higher priority when messages are transmitted at the same time. Or, the higher priority means that the UE intends to preferentially transmit a message of a higher priority in time among a plurality of messages. In the aspect of a plurality of UEs, since a message of a higher priority receives less interference compared to a message of a lower priority, it may be able to lower a reception error rate. If security overhead is included in the CAM, the CAM may have a bigger message size.

When a UE performs D2D transmission, the UE can semi-statically select a resource. Specifically, when the UE transmits a packet with a predetermined interval, the UE can perform an operation of maintaining a selected resource for predetermined time within the packet transmission interval to make an interference amount measurement of other UEs to be stabilized. According to the method above, it may have a merit in that neighboring UEs can reliably perform interference measurement and maintain a transmission resource when a packet is generated with a predetermined interval. Meanwhile, the UE can select a plurality of resources in consideration of several retransmissions. In this case, when such a waveform as SC-FDMA is used, if the UE selects a plurality of independent resources from a frequency region, since a single carrier property is lost, a problem of increasing a PAPR (peak and average power ratio) or CM (cubic metric) may occur. In particular, when the UE selects a plurality of resources, it is necessary to set a limit on the UE to make the UE select one contiguous frequency resource from one time resource (TTI (transmit time interval)).

In the following description, when a first UE performs a plurality of relevant transmissions, a method for the first UE to select a transmission resource is explained based on the aforementioned description. A plurality of the relevant transmissions may correspond to a retransmission for a packet. In this case, the retransmission may correspond to a repetition transmission of which a coded bit is also the same or a transmission transmitted by changing a redundancy version.

Embodiment 1

In the Aspect of Tx UE

When a retransmission resource is sequentially selected, the first embodiment relates to a method of setting a limit on a selection range of a following resource according to a position at which a previous/right before resource is selected. In particular, when a UE selects a resource for performing the second transmission, the selection of the resource is restricted by a position of a resource selected for the first transmission. The UE can perform the second transmission in the resource selected for the second transmission. The UE selects a resource for the third transmission after the second transmission is performed and may be able to perform the third transmission in the resource selected for the third transmission. Similarly, the UE may select a resource for the fourth transmission and performs the fourth transmission in the selected resource.

In this case, a resource capable of being selected for the second transmission may correspond to a resource positioned within +/−X subframes from a position of a resource selected for the first transmission. This is intended to prevent excessive HARQ buffering of an Rx UE. If the constraint above does not exist, a retransmission is performed in a subframe positioned at a very far away position and the Rx UE should store a corresponding packet in a buffer for a long time. This may lead to the increase of a HARQ buffer size required by the UE. Hence, when a (re)transmission resource is selected, if there is a constraint in a time domain according to a position of a previously selected resource, it is able to solve an excessive buffer problem. A value of the X (and X2 and X3 values described in the following) can be determined in advance, can be determined according to capability of (Rx) UE, or can be signaled via physical layer signaling or higher layer signaling.

Figure 10:
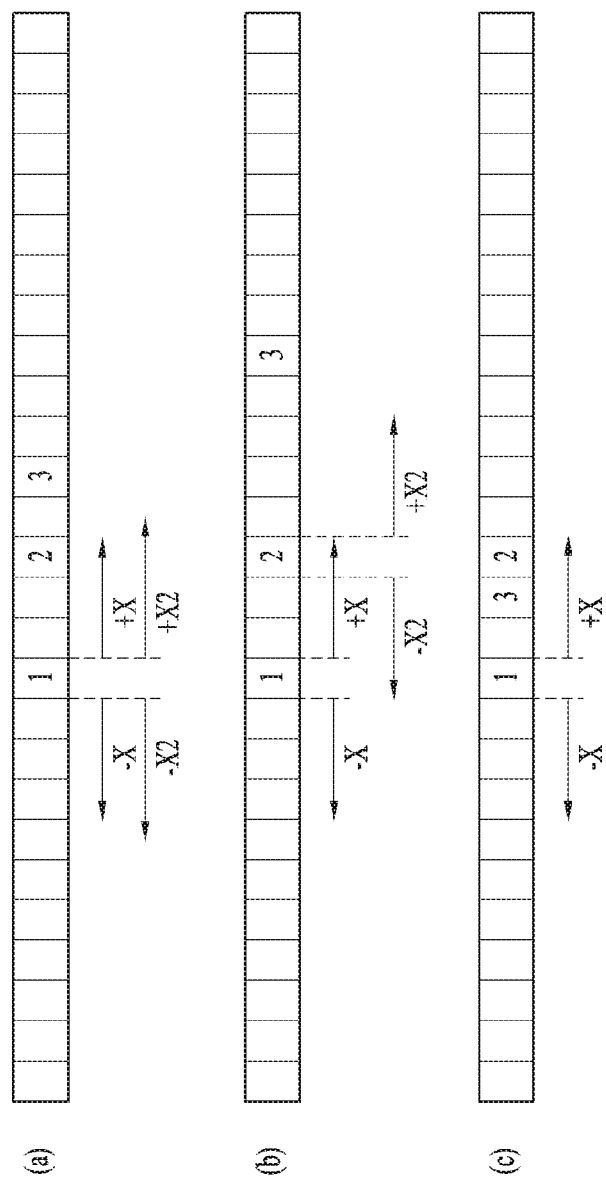
FIG. 10 is a flowchart illustrating an embodiment of the present disclosure.

And, a position of a resource capable of being selected for the third transmission can be determined according to a position of a resource selected for the first transmission, a position of a resource selected for the second transmission, or the like. FIG. 10 illustrates various examples for the resource position.

A resource capable of being selected for the third transmission may correspond to a resource positioned within +/−X2 subframes from a position of a resource selected for the first transmission. Referring to FIG. 10(a), when the first transmission resource is selected, the second transmission resource is going to be selected within +/−X subframes from the first transmission resource. In this case, the third transmission resource can be selected within +/−X2 subframes from the first transmission resource. A value of the X2 can be configured to be identical/different to/from a value of the X.

Or, the resource capable of being selected for the third transmission may correspond to a resource positioned within +/−X2 subframes from a position of a resource selected for the second transmission. As illustrated in FIG. 10(b), the third transmission resource can be selected within +/−X2 subframes from the second transmission resource or can be selected within +/−X2 subframes from both the first transmission resource and the second transmission resource.

Or, the resource capable of being selected for the third transmission may correspond to a resource positioned within +/−X subframes from a position of a resource selected for the first transmission. As illustrated in FIG. 10(c), both the second transmission resource and the third transmission resource can be selected from a resource positioned within +/−X subframes from the first transmission resource.

Referring to FIG. 10(b), when the third transmission resource is selected, it may have more candidate resources. Referring to FIG. 10(a) and FIG. 10(c), although the number of candidate resources is reduced, since both an initial transmission resource and a retransmission resource are allocated to a close position, it may have a merit in that it is able to reduce a HARQ buffer size of an Rx UE.

When a UE selects 4 resources, it may be able to determine a rule that a resource is to be selected within +/−X3 subframes only from a resource selected from among 3 preceding resources. Or, it may be able to determine a rule that a resource is to be selected within +/−X subframes only from a firstly selected resource. Values of the X, the X2, and the X3 can be determined in advance, can be signaled by a network, or can be individually configured/signaled. In some cases, all or a part of the values can be configured/signaled by the same value. The abovementioned scheme can be extensively applied to a case that the number of transmission resources is equal to or greater than 5.

In the Aspect of Rx UE

An operation of a UE receiving SA and/or data, which is transmitted according to the aforementioned various embodiments of the present invention, is explained in the following.

A second UE receiving the second transmission can perform HARQ combining on the first transmission and the second transmission only when an interval between the first transmission and the second transmission is less than a predetermined value. In this case, the predetermined value related to the HARQ combining can be determined according to the capability of the second UE. By doing so, it is able to more efficiently perform transmission and reception according to capability distribution of UEs that construct D2D communication. Specifically, when the number of D2D UEs having low capability is relatively less, if retransmission is performed for the D2D UEs with a narrow time interval, the retransmission can be inefficiently performed. In particular, it is able to increase efficiency of the overall D2D communication in a manner that a Tx UE performs resource selection and retransmissions with a relatively wider time interval and UEs having lower capability perform HARQ combining by selecting a part of the retransmissions only.

In the description above, when a resource for performing the second transmission is selected, a resource position selected for the first transmission can be excluded. Regarding this, it shall be explained in detail in the contents related to an embodiment 2 described in the following. In this case, although the embodiment 2 and the remaining embodiments are applied together with the embodiment 1, each of the embodiments can be independently used.

Embodiment 2

A method for a UE to sequentially select a retransmission resource is proposed. When a retransmission resource is sequentially selected, a previously selected subframe can be excluded from selectable resources. For example, assume that a UE performs 4 retransmissions on a specific packet. In this case, the UE can select a position of the first transmission resource through a sensing operation.

In this case, when the second resource is selected, the UE performs an operation of excluding a resource included in the firstly selected time resource (TTI (transmit time interval)). The UE excludes the resource included the firstly selected TTI (or subframe) and selects a position of the second resource from among the remaining resources. Specifically, the UE firstly excludes a resource not to be selected and may be then able to randomly select the second resource from among resources of which energy or receive power less than a predetermined threshold is measured. The method above is identically applied whenever a (re)transmission resource is selected. In this case, in order to prevent a (re)transmission resource from being selected in the same TTI, the UE performs sequential resource selection and an operation of excluding a resource included in a TTI of a previously selected resource. By doing so, it is able to prevent a plurality of transmission resources from being selected in the same TTI (or subframe).

As mentioned in the foregoing description, when a subframe of a previously selected resource is configured, it may simply exclude a subframe in which data is transmitted only. Or, it may exclude not only a subframe in which data is transmitted but also a subframe in which SA (scheduling assignment, D2D control signal or PSCCH) is transmitted (when SA and associated data are TDMed). For example, when a UE determines to transmit data in an $n^{th}$ subframe and transmits SA in an $(n-a)^{th}$ subframe, the $n^{th}$ subframe and the $(n-a)^{th}$ subframe can be excluded from transmittable resources. However, the operation above can be differently configured according to capability of a UE. For example, when a specific UE performs multi cluster transmission, if performance of a power amplifier is good and a power back off value is not big, it may not exclude a resource of SA when a next data resource is selected. In particular, when a UE sequentially selects a transmission resource of data and a transmission resource of SA, if it is necessary for the UE to select a plurality of data resources, it may or may not exclude a transmission subframe of SA depending on the capability of the UE.

Embodiment 3

When multiple retransmission resources are selected for a message, it may set a limit on a region of a resource to be selected on the basis of a specific resource selection. In order to maintain single carrier property, resources included in a previously selected subframe (or TTI) can be excluded from the selection. In this case, the second and the third resources can also perform sensing-based resource selection. A UE can directly measure energy of an individual resource. Or, the UE can measure energy of a different channel indicating a position of an individual resource to measure energy per resource via a scheme of indirectly measuring energy of the resource. After the energy is measured, the UE can select a resource at which low energy is measured. In this case, in order to prevent neighboring UEs from selecting the same resource, it may randomly select a resource from among resources at which energy less than a predetermined threshold is measured. In this case, a resource to be selected can include a resource within a TTI including a previously selected resource and resources within a resource selection range on the basis of a position of the previously selected resource.

Embodiment 4

When a UE selects a resource in which SA is transmitted, the UE can select the resource from among resource candidate positions based on an offset indicating a time position of data in the SA or a data position selected according to the number of bits indicating data in the SA. For example, when the UE selects a data resource in an $N^{th}$ subframe and SA signals a data position by 2 bits, N-a1, N-a2, N-a3, and N-a4 may correspond to candidate resource positions of the SA (4 different types are available according to the number of bits indicated by the SA) and a resource for transmitting the SA can be selected from the 4 resource positions. In this case, as mentioned in the foregoing description, a time resource position of a previously selected SA can be excluded to maintain single carrier property. The time resource position of the previously selected SA may or may not be excluded depending on capability of the UE.

Embodiment 5

Meanwhile, when a resource is sequentially selected, if there is no selectable resource anymore, it may drop a not selected resource for a corresponding message transmission. For example, when a UE selects a transmission resource 4 times, if the UE fails to select the remaining resource after selecting a resource 3 times, the UE does not select the fourth resource and drops a packet of the fourth transmission.

When the deficiency occurs in selectable resources and there is no selectable resource anymore, a UE may select a resource by expanding a candidate resource range rather than dropping a packet. For example, when the first and the second resources are selected within +/−X subframes and there is no selectable resource for the third resource, the third resource can be selected within +/−X2 subframes (X2>X).

Embodiment 6

When an interval between a previously selected resource and a resource selected after the previously selected resource is equal to or greater than a predetermined time interval (how to identify the interval?), it may not perform HARQ combining on a signal received in a corresponding resource. This is similar to what is mentioned earlier in the embodiment 1. This technical characteristic itself can be independently used. This is intended to lower complexity of a UE and cost by preventing implementation of an excessive HARQ buffer.

The aforementioned description can be applied not only to D2D communication but also to uplink or downlink. In this case, a base station, a relay node, and the like can use the proposed method.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal). Or, it may be able to define a rule that a Tx UE signals the information to an Rx UE or the Rx UE requests the information to the Tx UE.

Configurations of Devices for Embodiments of the Present Invention

Figure 11:
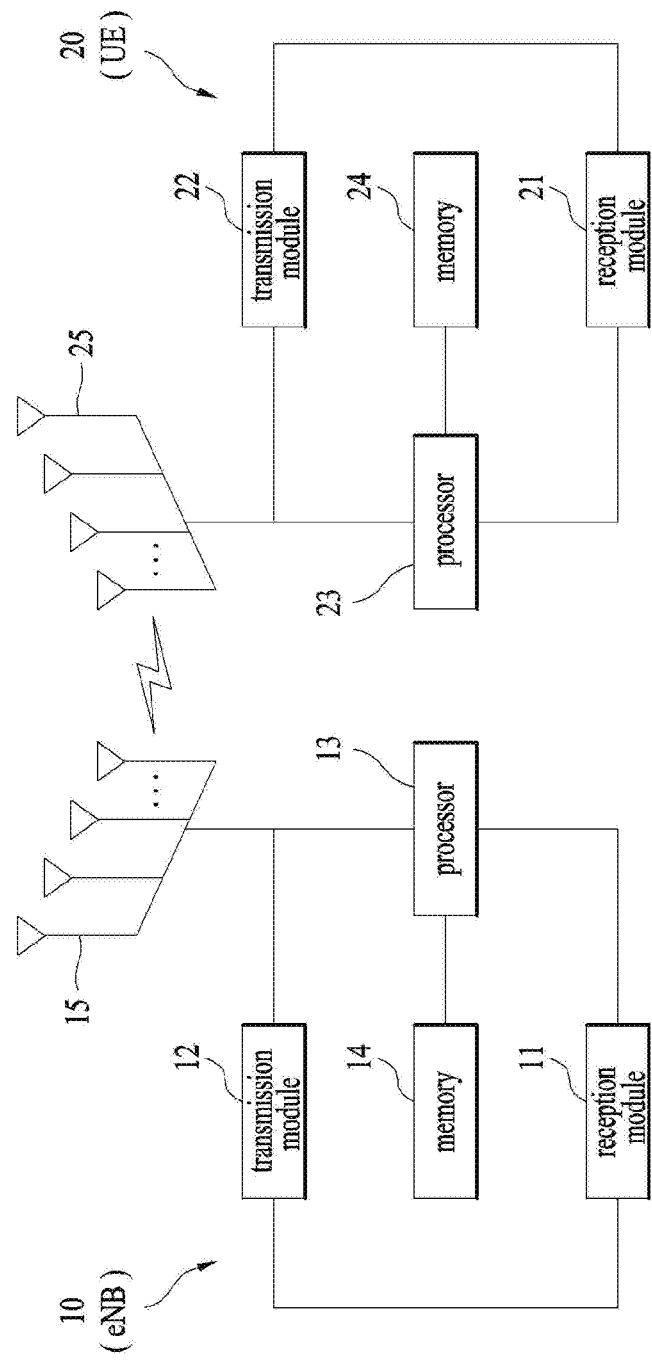
FIG. 11 is a block diagram of a transmission apparatus and a reception apparatus.

FIG. 11 is a diagram for configurations of a transmit point apparatus and a UE.

Referring to FIG. 11, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10. The processor 13 of the transmit point apparatus 10 according to one embodiment of the present invention may perform processes necessary for the embodiments described above.

Besides, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 11, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above. Specifically, when the processor selects a resource for performing the second transmission, the selection of the resource is restricted by a position of a resource selected for the first transmission. The processor can perform the second transmission using the transmit module in the resource selected for the second transmission.

In addition, the processor 23 of the UE device 20 may perform a function of processing information received by the UE device 20, information to be transmitted by the UE device 20, and the like. The memory 24 may store the processed information during a prescribed time period and be substituted with a component such as a buffer (not shown in the drawing) or the like.

The configurations of the transmission point device and the UE device may be implemented such that the above-described embodiments can be independently applied or two or more thereof can be simultaneously applied, and redundant description is omitted for clarity The description of the transmission point device 10 in FIG. 11 may be equally applied to a relay as a downlink transmission entity or an uplink reception entity, and the description of the UE device 20 in FIG. 11 may be equally applied to a relay as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of performing a sidelink communication by a user equipment (UE) in a wireless communication system, the method comprising:
    selecting a first resource for performing a first signal transmission based on channel sensing on a sidelink resource pool;
    selecting a second resource for performing a second signal transmission within the sidelink resource pool based on a time domain position of the first resource selected for the first signal transmission; and
    performing the first signal transmission and the second signal transmission based on the first resource and the second resource,
    wherein the first signal transmission is related to a new transmission, and the second signal transmission is related to a re-transmission, and
    wherein in the selection of the second resource, the UE randomly selects the second resource within the sidelink resource pool while excluding the first resource in time domain such that the second resource is located within a specific number of subframes from a subframe at which the first resource is located, but the second resource is not located at a same time domain position as the first time resource.

2. The method of claim 1, wherein a first signal of the first signal transmission and the second signal transmission are related to hybrid automatic repeat request (HARQ) transmissions.

3. A user equipment (UE) configured to perform sidelink communication, the UE comprising:
    a transceiver including a transmitter and a receiver; and
    a processor configured to:
    select a first resource for performing a first signal transmission based on channel sensing on a sidelink resource pool;
    select a second resource for performing a second signal transmission within the sidelink resource pool based on a time domain position of the first resource selected for the first signal transmission; and
    perform, through the transceiver, the first signal transmission and the second signal transmission based on the first resource and the second resource,
    wherein the first signal transmission is related to a new transmission, and the second signal transmission is related to a re-transmission, and
    wherein in the selection of the second resource, the processor randomly selects the second resource within the sidelink resource pool while excluding the first resource in time domain such that the second resource is located within a specific number of subframes from a subframe at which the first resource is located, but the second resource is not located at a same time domain position as the first time resource.

4. The method of claim 1, wherein the second resource is selected in a range of a subframe #n−k to a subframe #n+k, excluding subframe #n, where subframe #n denotes the time domain position of the first resource, and k denotes the specific number of subframes.

5. The method of claim 4, wherein the second resource is selected from the range based on channel sensing.

6. The method of claim 4, wherein k is fixed to a predefined constant.

7. The method of claim 1, wherein the first resource is selected randomly in the sidelink resource pool based on channel sensing.

8. The method of claim 1, wherein the first signal transmission includes at least one of sidelink data transmission or sidelink scheduling assignment (SA) transmission.

9. The method of claim 1, wherein the second signal transmission includes at least one of sidelink data transmission or sidelink scheduling assignment (SA) transmission.

10. A non-transitory processor-readable medium recorded thereon program code for performing the method of claim 1.

11. A device for processing a signal for a sidelink communication, the device comprising:

a memory configured to store instructions; and a processor configured to perform operations by executing the instructions, the operations comprising:

selecting a first resource for performing a first signal transmission based on channel sensing on a sidelink resource pool;

selecting a second resource for performing a second signal transmission within the sidelink resource pool based on a time domain position of the first resource selected for the first signal transmission; and performing the first signal transmission and the second signal transmission based on the first resource and the second resource, wherein the first signal transmission is related to a new transmission, and the second signal transmission is related to a re-transmission, and wherein in the selection of the second resource, the processor randomly selects the second resource within the sidelink resource pool while excluding the first resource in time domain such that the second resource is located within a specific number of subframes from a subframe at which the first resource is located, but the second resource is not located at a same time domain position as the first time resource.

* * * * *